United States Patent Office 3,282,870
Patented Nov. 1, 1966

1

2

3,282,870
STARCH AND POLYCARBOXAMIDE REACTION PRODUCTS

David E. Harmer, Midland, Mich., assignor to The Dow Chemical Company, Midland, Mich., a corporation of Delaware No Drawing. Filed Nov. 29, 1963, Ser. No. 327,116

3 Claims. (Cl. 260—17.4)

The present invention relates to water-swellable reaction products of water-soluble starch products and water-soluble, polyalkane polymers having substituent carboxamide groups, which reaction products are effective thickeners for aqueous systems.

Water-swellable organic thickeners are incorporated into water employed in fighting fires or into aqueous sprays of biologically active agents. One reason for the use of the thickeners is to increase the retention of the aqueous systems on the objects to which they are applied. Illustratively, forest fires spread the most rapidly through the tops of trees, especially the conifereous types. This makes the fires difficult to contain and control by the application of water as most of the water runs off the trees. As a remedy, it has been proposed to incorporate thickeners into water applied to the trees whereby water run off is decreased, and as a result, the effectiveness of the applied water as a fire retardant blanket is increased.

In spraying biologically active agents different problems are encountered. One of these is that while the spray is descending through the air under the force of gravity, a large percentage of the active ingredient may be dissipated in a relatively less effective vapor form. Depending upon the volatility of the biologically active agent and the height of the applicating spray means, losses through volatilization may render the spray technique economically unfeasible. Another aspect of the spray problem involves spray drift. To minimize such drift, it has been proposed to gel the spray composition such that upon spraying it forms large discrete and rapidly settling particles.

In view of the foregoing it is desirable and an object of the present invention to provide a novel gelling agent for aqueous systems. It is a particular object to provide an organic gelling agent useful for thickening water used in fire fighting or aqueous sprays used for biological treatments.

The aforementioned objects, and other benefiits as will become apparent hereinafter, are achieved in a water-swellable thickener which is an interreaction product of a water-soluble starch product with a water-soluble polyalkane containing a plurality of carboxamide substituents. These interreaction products are readily dispersible in water. The viscosity of the resulting dispersion will vary from substantial liquidity, to a gel like consistency essentially in direct proportion to the concentration of the thickener. Such dispersions, however, are not infinitely dilutable with water without visual phase separation and the polymeric gel phase is readily separated from an aqueous dispersing medium by filtration. Thus, the interreaction products of the invention produce when dispersed in water highly water swollen but individual gel particles.

The interreaction products comprise a chemically cross-linked network of one or more of the naturally occurring components of a water-soluble starch product, e.g., amylose or amylopectin, together or individually, or derivatives thereof such as dextrin, with a water-soluble polyalkane containing a plurality of carboxamide groups. Such a polyalkane is obtained by the vinyl polymerization of monoethylenically unsaturated monomers of which preferably at least about 50 percent are monoethylenically unsaturated monomers having carboxamide substituents.

The water-swellable interreaction products of the invention are obtained by dispersing the starch product and water-soluble polyalkane containing carboxamide groups in an inert reaction medium. The inert reaction medium should possess sufficient solvency for these reacting ingredients that they are at least highly swollen and homogeneously dispersible therein. Satisfactory for this purpose are water and miscible combinations of water and organic solvents, e.g., lower alcohols and ketones in which combinations water constitutes at least about 50 percent by weight of the mixture. For best results the resulting dispersion should contain from about 5 up to possibly as much as about 50 percent by weight of the reacting ingredients. The relative proportions of the individual reacting ingredients should be from about 5 to about 60 percent by weight of the water-soluble polyalkane having carboxamide substituents and correspondingly from about 95 to about 40 percent by weight of the water-soluble starch product. Preferably the polyalkane is present in an amount of at least 10 percent but no more than about 40 percent by weight of the reacting ingredients.

The dispersion thus constituted is heated at an elevated temperature in the range from about 50° up to as much as 200° C. The pressure on the system is at least that required to maintain the temperature. This heating operation is continued for a period of time sufficient to produce the interreaction product. While significant product is obtained within a few minutes after heating the system to a reaction temperature, it is preferred to heat the mixture for at least an hour. Evidence that the reaction has occurred is the appearance of gels in the reaction system. Such materials are evidenced in aqueous dispersion as discrete, particulate gels, i.e., highly water-swollen organic polymeric matrices.

While it is not necessary for operability, the foregoing reaction is aided with the use of a catalyst. Suitable catalysts include any of the Lewis acids. Preferred among these acids are the strong protonic acids, sometimes otherwise called mineral acids, such as hydrochloric acid, sulfuric acid, and nitric acid. The use of a small amount of the acid catalyst increases the reaction rate and the extent to which the two types of polymeric chains, i.e., the polysaccharides of the starch product and the polyalkane having the carboxamide groups are ultimately bridged. The amount of catalyst used varies according to the type of catalyst and the desired reaction rate, but generally good results are achieved using as little as about 0.02 up to as much as about 1.0 percent by weight of the catalyst based on the weight of the entire reaction system.

Initially a starch, as directly produced from a particular grain, is usually insoluble in cold water and must be given a thermal treatment in water to promote its solubility properties, whereby it is rendered suitable for use in the invention as a water-soluble starch product. Among such starch products are the gelatinized starches as well as the cold water-soluble dried starches. Also useful in the invention are water-soluble starch fractions, e.g., amylose and amylopectin. Other thermal degradation derivatives of starch molecules such as dextrin can also be used.

The water-soluble polyalkanes containing substituent carboxamide groups as hereinbefore described should have a weight average molecular weight of at least about 10,000. In essence they are polyalkane chains obtained by the vinyl polymerization of monoethylenically unsaturated monomers of which preferably at least about 50 mole percent are substituted by carboxamide groups.

Such polymers are obtained by the homopolymerization of acrylamide or methacrylamide, or by the copolymerization of these monomers with other suitable monoethylenically unsaturated compounds copolymerable therewith. When the comonomer used contains a water solubilizing group as, for example, in copolymers of acrylamide or methacrylamide with acrylic acid, methacrylic acid, maleic acid, vinylbenzyl ammonium compounds (e.g., trimethylvinylbenzyl ammonium chloride), vinylbenzene sulfonic acid, N-vinyl oxazolidinone, N-vinyl pyrrolidinone, N-vinyl morpholinone, vinyl alcohol and the like, the copolymer may contain a substantial proportion of such comonomer. A preferred acrylamide polymer corresponds to a copolymer of 70 to 99 percent acrylamide and 30 to 1 percent acrylic acid. Such polymers are conventionally obtained by monopolymerizing acrylamide under conditions such that from 1 to 30 percent of the available carboxamide groups are hydrolyzed to carboxylate groups. Other suitable comonomers containing no such water solubilizing groups include, for example, ethylene, butylene, styrene, methyl or ethyl esters of acrylic and methacrylic acids, vinyl chloride, vinylidene chloride, acrylonitrile, vinyl acetate, vinyl propionate, methylvinyl ether and propylvinyl ether. With such hydrophobic comonomers, the amount used must not be so great as to impair the water solubility of the resulting copolymer. In any event, the required acrylamide homopolymers and copolymers are essentially water-soluble polymers having little or no cross-linking between the polymer chains and contain in polymerized form at least 50 mole percent of a carboxamide substituted monomer.

The above-described acrylamide polymers are known to the art. They are prepared by any of several known techniques which fundamentally comprise dispersing the monomers in a suitable solvent medium such as water in the presence of a chemical free radical catalyst. Polymerization is then conducted under controlled temperature conditions within the range from about 0 to 140° C. Depending upon the temperature conditions utilized and the nature of the reactants, it may be necessary in some instances to conduct the polymerization reaction in a pressurized system. While the polymer sols thus prepared can be used directly, the polymer is usually recovered from the polymerization system as a dry solid product. Vacuum drying or any other convenient separatory technique, or combination of techniques, can be utilized effectively for this purpose.

The following examples are illustrative of the invention and represent preferred embodiments as the invention is presently understood. The limitations and particular conditions of the examples are germane to the specific embodiments concerned therein and should not be construed as limitations on the overall invention.

EXAMPLE 1

A water-soluble, iodometric starch and a polyacrylamide (PAAm) having a molecular weight of at least about one million were dissolved in deionized water to provide a mutual solution thereof. Several solutions prepared in this manner, each containing 10 percent solids and each having different relative amounts of polyacrylamide and starch, were sealed in Pyrex ampoules and heated for extended periods. At the completion of the thermal reactions, the resulting gels were dried by exposure to ambient air. The dried reaction product was ground with a mortar and a pestle to provide a visually homogeneous granular material.

One-quarter gram of each polymer prepared in this manner was placed in a 2 ounce bottle with 15 milliliters of water. The bottle was sealed with a screw cap and agitated for about 16 hours. Subsequently, the dispersion of the polymer in water was subjected to centrifugation for 5 minutes at a speed of about 4,000 r.p.m. The volume of the gel settled in the centrifuge tube was observed, multiplied by 4 and reported as the swelling volume per gram of polymer.

The time and temperature conditions for carrying out the reaction, along with the ratio of polyacrylamide to starch in the reacting disperse solids, and the results of the swelling test are set forth in the following table.

TABLE

| Run No. | PAAm, wt. percent [1] | Starch wt. percent [1] | Reaction Temp., °C. | Reaction Time, hrs. | Swelling Vol. (ccs./gm.) |
|---|---|---|---|---|---|
| 1 | 70 | 30 | 90 | 64 | 72 |
| 2 | 80 | 20 | 90 | 64 | 68 |
| 3 | 90 | 10 | 90 | 64 | 16 |
| 4 | 95 | 5 | 90 | 64 | 6 |
| 5 | 70 | 30 | 130 | 20 | 52 |
| 6 | 80 | 20 | 130 | 20 | 24 |
| 7 | 90 | 10 | 130 | 20 | 8 |
| 8 | 95 | 5 | 130 | 20 | 4 |
| 9 | 70 | 30 | 110 | 20 | 56 |
| 10 | 80 | 20 | 110 | 20 | 36 |
| 11 | 90 | 10 | 110 | 20 | 8 |
| 12 | 95 | 5 | 110 | 20 | 8 |

[1] The percentages are based on the total weight of the reacting ingredients.

For the purposes of comparison control runs were made in a like manner except the starch and polyacrylamide reactants were utilized individually. In these runs, which were made under the 3 different sets of reaction conditions set forth above, the swelling volume was zero. This result reflects the fact that the polyacrylamide and starch remained dissolved subsequent to being heated individually and did not stratify during centrifugation of the reaction system. Thus, the thermal solution treatment of either the pure starch material or the pure polyacrylamide does not produce the desired water-swellable product.

EXAMPLE 2

In a manner similar to the procedure used in Example 1, the starch and polyacrylamide were reacted in an aqueous solution thereof containing 10 percent by weight total solids consisting of 20 percent by weight of the polyacrylamide and 80 percent by weight of the starch product. This solution was heated at 110° C. for 85 hours. In a second run 0.1 percent by weight hydrogen chloride was added to an otherwise identical reaction ssytem. The swelling volume of the polymer prepared without the catalyst was 24 while that prepared with the catalyst was 65.

In a manner similar to the foregoing, other catalysts including such other strong protonic acid catalysts as sulfuric, nitric and chloroacetic acids, are substituted for the hydrogen chloride to produce a similarly significant increase in gel strength, or swelling volume, of the resulting interreaction product of a soluble starch with polyacrylamide or other water-soluble polyalkane having a plurality substituent carboxamide groups.

The aforedescribed interreaction products are particularly utile in applications for gelling aqueous fire fighting liquids. For example, the interreaction products are stirred into water to be sprayed or dropped onto a fire in amounts sufficient to thicken the water whereby it will not readily run off surfaces to which it is applied. Uusually an amount of the polymer from about 0.5 up to 3 percent by weight of the water is satisfactory for this purpose.

What is claimed is:
1. A method which comprises the steps of:
   mutually dissolving a water-soluble polyalkane having a plurality of substituent carboxamide groups and a water-soluble starch product in an inert aqueous solvent;
   heating the resulting solution at an elevated temperature within the range from about 50 to about 200° C. under a pressure sufficient to maintain the desired reaction temperature whereby a water-swellable reaction product is obtained;

separating the reaction product from the inert reaction medium and including the additional sequential step of drying and pulverizing the interaction product obtained from the reaction medium.

2. The process of claim 1 wherein the heating of the solution is carried out at an elevated temperature within the range from about 80 to about 140° C.

3. A method as in claim 1 wherein the total amount of water-soluble polyalkane and water-solhble starch dissolved consists of from about 10 to about 60 percent by weight of a water-soluble polyalkane polymerized from monomers consisting of at least 50 mole percent of a monoethylenically unsaturated, water-soluble monomer having a carboxamide substituent group and a remainder of monoethylenically unsaturated monomers copolymerizable therewith and from about 90 to about 60 percent by weight of a water-soluble starch product.

References Cited by the Examiner
UNITED STATES PATENTS 2,804,436   8/1957   Ritson _____ 260—17.4

WILLIAM H. SHORT, *Primary Examiner.*

J. NORRIS, *Assistant Examiner.*